(12) United States Patent
Uehara

(10) Patent No.: US 9,243,308 B2
(45) Date of Patent: Jan. 26, 2016

(54) APPARATUS AND METHOD FOR RECOVERING LITHIUM

(71) Applicant: Haruo Uehara, Saga (JP)

(72) Inventor: Haruo Uehara, Saga (JP)

(*) Notice: Subject to any disclaimer, the term of this patent is extended or adjusted under 35 U.S.C. 154(b) by 397 days.

(21) Appl. No.: 13/656,165

(22) Filed: Oct. 19, 2012

(65) Prior Publication Data

US 2013/0108527 A1 May 2, 2013

Related U.S. Application Data

(63) Continuation of application No. PCT/JP2010/057121, filed on Apr. 22, 2010.

(51) Int. Cl.
| | |
|---|---|
| *C22B 26/12* | (2006.01) |
| *C22B 3/02* | (2006.01) |
| *C22B 3/22* | (2006.01) |
| *C22B 3/24* | (2006.01) |

(52) U.S. Cl.
CPC . *C22B 26/12* (2013.01); *C22B 3/02* (2013.01); *C22B 3/22* (2013.01); *C22B 3/24* (2013.01); *Y02W 30/54* (2015.05)

(58) Field of Classification Search
CPC ............ C22B 3/02; C22B 26/12; C22B 3/24; C22B 3/22
USPC ........................................ 423/179.5; 422/187
See application file for complete search history.

(56) References Cited

FOREIGN PATENT DOCUMENTS

| JP | 04-247834 A | 9/1992 |
|---|---|---|
| JP | 06-088277 A | 3/1994 |
| JP | 2002-088420 A | 3/2002 |
| JP | 2002-167628 A | 6/2002 |
| JP | 2009-161794 A | 7/2009 |

OTHER PUBLICATIONS

Umeno, et al., Preparation and Adsorptive Properties of Membrane-Type Adsorbents for Lithium Recovry from Seawater, Ind. Eng. Chem. Res. 2002; 41: 4281-4287.*

* cited by examiner

*Primary Examiner* — Daniel C McCracken
(74) *Attorney, Agent, or Firm* — Dingman, McInnes & McLane, LLP

(57) ABSTRACT

The apparatus for recovering Lithium comprises: a supply unit (1) in which lithium-containing water is passed through a filter membrane to yield lithium solution; an adsorption unit (2) in which said solution adsorb the lithium in a column; an elution unit (3) by which hydrochloric acid elute the lithium in the column, yielding a lithium elute containing hydrochloric acid and lithium chloride; a cleaning unit (4) by which the column is washing; a condensing unit (5) in which the lithium elute is circularly vaporized, and the vapor is condensed to yield concentrated lithium chloride solution; a collecting unit (6) in which sodium carbonate is added to lithium chloride solution to collect the lithium as concentrated lithium solution; and a hydrochloric acid recycling unit (7) in which the residue from lithium chloride solution is cooled to yield the hydrochloric acid as used in the elution unit (3).

5 Claims, 2 Drawing Sheets

APPARATUS AND METHOD FOR RECOVERING LITHIUM

RELATED APPLICATIONS

This patent application is a continuation of International Application No. PCT/JP2010/057121, filed on Apr. 22, 2010, entitled, "Device and Method for Recovering Lithium," the contents and teachings of which are hereby incorporated by reference in their entirety.

FIELD

The present invention relates to a lithium recovery apparatus for recovering lithium and a method for such a recovery, and especially to a lithium recovery apparatus, which permits an effective separation recovery of lithium with high purity, as well as an apparatus for such a recovery.

BACKGROUND

Lithium is rare non-ferrous metal, which has been widely used in a secondary battery, a special glass, a single-crystal oxide, an aircraft, a spring material, etc. Global demands for lithium have recently increased along with demand expansion of information technology devices. Demands for the lithium will further increase. Producing countries of the lithium are concentrated, and it is therefore desirable to recover the lithium in a stable manner in countries having no mineral resources for lithium.

As a conventional lithium recovery method, there is for an example a method in which adsorption and desorption of lithium ion in an aqueous solution are carried out by using manganese oxide electrodes, which have been obtained by condensing lithium or magnesium from lithium-bearing manganese oxide or magnesium-bearing manganese oxide, respectively, and varying an applied voltage (see Japanese Patent Provisional Publication No. H06-088277). In addition, as a conventional lithium recovery method, there is for an example a method comprising the steps of bringing an adsorbent, which has been prepared from raw materials of β-diketone, neutral organic phosphorous compound and vinyl monomer having a cyclic structure, into contact with an aqueous solution containing at least lithium, sodium and calcium, in a pH value of 7 or more of the solution to cause metallic components in the solution to be adsorbed on the above-mentioned adsorbent, and then bringing them into contact with water having a pH value of 4±1.5 to desorb the lithium (see Japanese Patent Provisional Publication No. 2009-161794).

SUMMARY

However, the conventional lithium recovery method has a problem of an increased cost required for a scale-up operation on an industrial basis in case of applying an electrochemical technique. In addition, the conventional lithium recovery method has a problem of low purity of lithium, due to an existence of organic substances with the lithium as recovered in case of utilizing an organic solvent.

An object of the present invention, which was made to solve the above-mentioned problems, is to provide a lithium recovery apparatus, which permits to recover effectively lithium having a high purity upon a separation recovery of lithium and to perform an easy scale-up operation on an industrial basis to save costs, as well as a method for such an recovery.

A lithium recovery apparatus according to the present invention comprises: an adsorption unit that causes a lithium solution containing lithium to flow into a column comprising a bioadsorbable membrane and/or manganese oxide to cause the lithium to adsorb on the column; an elution unit that causes hydrochloric acid to flow into the column to elute the lithium adsorbed on the column, to prepare a lithium elution liquid containing the hydrochloric acid and lithium chloride; a condensing unit that subjects the lithium elution liquid prepared by the elution unit to a heating treatment and a hydrochloric acid solution removing treatment in a cyclic manner to condense a lithium chloride solution obtained by the treatments; and a collecting unit that causes sodium carbonate to be added to the lithium chloride solution obtained by the condensing unit, to collect the lithium in a form of a solution of a condensed lithium precipitation containing lithium carbonate and sodium chloride.

According to the lithium recovery apparatus of the present invention, the condensing unit subjects the lithium elution liquid prepared by the above-mentioned elution unit to the heating treatment in a cyclic manner to vaporize the hydrochloric acid and causes the vapor to be condensed to prepare the lithium chloride solution in condensation, and the collecting unit causes the sodium carbonate to be added to the lithium chloride solution obtained by the condensing unit as mentioned above, and permits to collect the lithium in a form of precipitate containing the lithium carbonate and the sodium chloride. It is therefore possible to condense the lithium in a multilayer process, thus separating and recovering the lithium having a high purity in an easy manner.

The lithium recovery apparatus according to the present invention comprises may further comprise where appropriate: a hydrochloric acid recycling unit that subjects a residual liquid of the lithium chloride solution condensed by said condensing unit to a cooling treatment to recycle the hydrochloric acid obtained through said cooling treatment as the hydrochloric acid as flown in said elution unit. In the lithium recovery apparatus according to the present invention, the hydrochloric acid recycling unit causes the residual liquid of the lithium chloride solution condensed by the condensing unit as described above to vapor, causes the vapor as obtained through this vaporization to cool and condense to create hydrochloric acid, and causes the hydrochloric acid obtained from the residual liquid as mentioned above to be recycled as the hydrochloric acid as flown in the elution unit as mentioned above. It is therefore possible to control an amount of the hydrochloric acid as initially supplied, thus leading to reduction in costs associated with the hydrochloric acid and effective utilization of the sources.

The lithium recovery apparatus according to the present invention comprises may further comprise where appropriate: a supply unit that causes any one of seawater, salt lake water, geothermal water or a waste-dissolved solution, which contains the lithium, to pass through a filter membrane to prepare the lithium solution in the adsorption unit. In the lithium recovery apparatus according to the present invention, the supply unit causes any one of the seawater, the salt lake water, geothermal water or the waste-dissolved solution, which contains the lithium, to pass through the filter membrane to prepare the lithium solution in the adsorption unit. It is therefore possible to enhance the adsorption efficiency of the lithium in the above-mentioned adsorption unit, thus performing the adsorption of the lithium in higher concentration.

The lithium recovery apparatus according to the present invention comprises may further comprise where appropriate: a cleaning unit that washes the column, with water, in which the lithium has been eluted with the hydrochloric acid in the elution unit. In the lithium recovery apparatus according to the present invention, the cleaning unit washes the column, with water, on which the lithium has been adsorbed by the above-mentioned adsorption unit. It is therefore possible to enhance the adsorption efficiency of the lithium in the above-mentioned adsorption unit by maintaining the adsorption capability of the column, thus performing the adsorption of the lithium in higher concentration.

The lithium recovery apparatus according to the present invention comprises may further comprise where appropriate: a lithium solution mixing unit that causes a pure lithium carbonate solution to be added to the condensed lithium solution prepared by the collecting unit. In the lithium recovery apparatus according to the present invention, the lithium solution mixing unit causes the pure lithium carbonate solution to be added to the condensed lithium solution prepared by the collecting unit. It is therefore possible to increase further the concentration of the lithium from the condensed lithium solution, thus performing recovery of the lithium in further high concentration.

DETAILED DESCRIPTION

Figure 1:
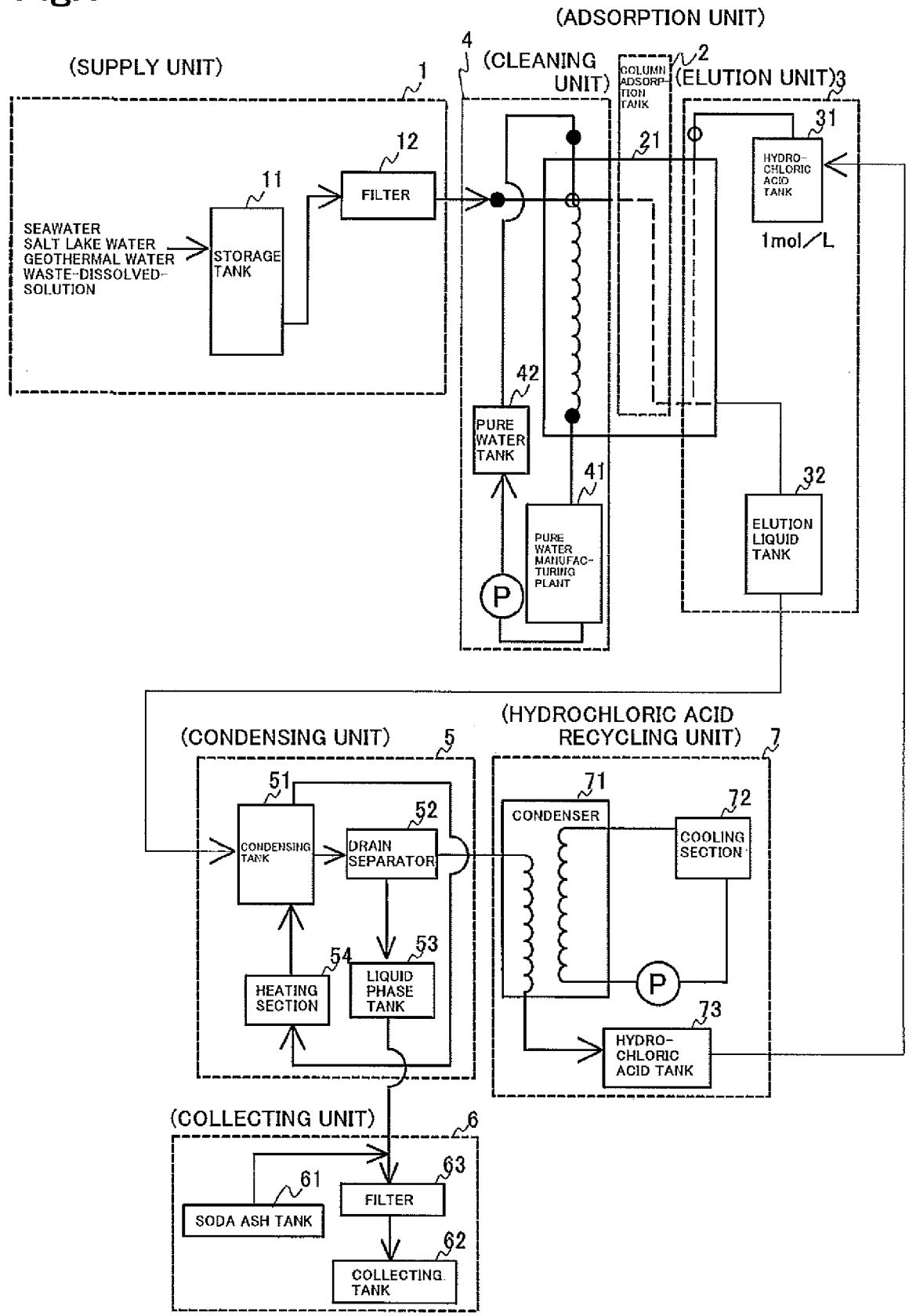
FIG. 1 is a schematic descriptive view of a lithium recovery apparatus according to the present invention.
Figure 2:
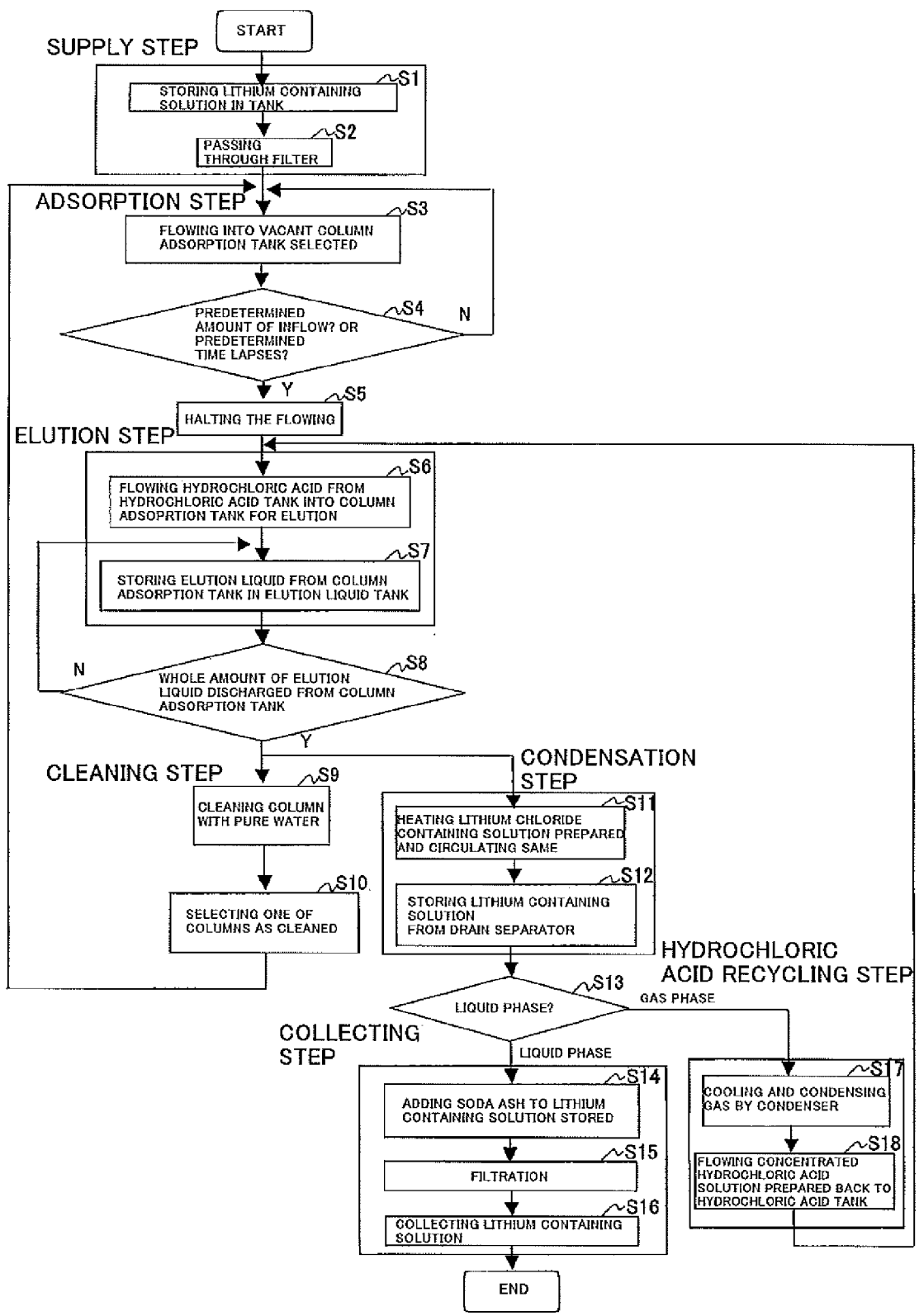
FIG. 2 is a flowchart of the lithium recovery method according to the present invention.

Now, description will be given below of an embodiment of the lithium recovery method of the present invention with reference to FIGS. 1 and 2. FIG. 1 is a schematic descriptive view of the lithium recovery apparatus according to the present invention and FIG. 2 is a flowchart of the lithium recovery method according to the present invention.

The lithium recovery apparatus according to the present invention includes a supply unit 1 that causes any one of seawater, salt lake water, geothermal water or a waste-dissolved solution, which contains the lithium, to pass through a filter membrane to prepare a lithium solution containing the lithium; an adsorption unit 2 that causes the lithium solution to flow into a column made of manganese oxide to cause the lithium to adsorb on this column; an elution unit 3 that causes hydrochloric acid to flow into this column to elute the lithium adsorbed on the column, to prepare a lithium elution liquid containing the hydrochloric acid and lithium chloride; a cleaning unit 4 that washes the column, with water, in which the lithium has been eluted with the hydrochloric acid in the elution unit 3; a condensing unit 5 that subjects the lithium elution liquid prepared by the elution unit 3 to a heating treatment to vapor the hydrochloric acid in a cyclic manner to condense the vapor to prepare a lithium chloride solution through condensation; a collecting unit 6 that causes sodium carbonate to be added to the lithium chloride solution obtained by the condensing unit 5, to collect the lithium in a form of a solution of a condensed lithium precipitation containing lithium carbonate and sodium chloride; and a hydrochloric acid recycling unit 7 that subjects a residual liquid of the lithium chloride solution condensed by the condensing unit 5 to a cooling treatment to recycle the hydrochloric acid obtained through the cooling treatment as the hydrochloric acid as flown in the elution unit 3, as shown in FIG. 1.

The supply unit 1 is provided with a storage tank 11, which is made of a stainless steel to store seawater, salt lake water, geothermal water or a waste-dissolved solution, as a lithium containing solution, and a filter 12 having a multiple structure. This filter 12 has at least the two-layer structure and is capable of removing impurities, which are included in the lithium containing solution and have a large particle size.

The adsorption unit 2 is provided with a plurality of column adsorption tanks 21, which are made of a stainless steel and filled with a bioabsorbable membrane and/or manganese oxide on which the lithium adsorbs selectively. The column adsorption tanks 21 are described as a plurality of tanks to reduce an amount of treatment by each tank. However, a single tank may be used. As material with which the column adsorption tank 21 is filled, there may be used various kinds of material having a particle size of from 100 µm to 1 mm in the form of fine particles or membranes. It is preferable to use, as the column adsorption tank 21, a column, which is filled with a λ-type manganese oxide (in the form of fine particles or membranes) having a high lithium adsorption capability, and there may be used a lithium adsorbent as disclosed for example in Japanese Patent No. 3937865.

The elution unit 3 is provided with a hydrochloric acid tank 31 for storing hydrochloric acid and an elution liquid tank 32 for storing a solution for elution from the column adsorption tank 21. The cleaning unit 4 is provided with a pure water manufacturing plant 41 for manufacturing pure water and a pure water tank 42 for storing the pure water manufactured by the pure water manufacturing plant 41. As such a pure water manufacturing plant 41, there may be used various kinds of general pure water manufacturing plants, and there may be used for example a water supply/treatment system disclosed by the present inventor (Japanese Patent Provisional Publication No. 2010-029750).

The condensing unit 5 includes a condensing tank 51, which is made of a stainless steel and stores the elution liquid from the elution liquid tank 32, a drain separator 52 for separating/removing the hydrochloric acid solution contained in the vapor from a stock solution of this condensing tank 51, a liquid phase tank 53, which is made of a stainless steel and stores the hydrochloric acid solution in liquid phase as separated/removed through the drain separator 52, and a heating section 54 to heat the stock solution of the condensing tank 51 and cause it to flow back into the condensing tank 51. As the drain separator 52, there may be used one of various kinds of drain separators as offered commercially. However, there may be used an in-line type drain separator, which is incorporated between a compressor and a piping, or a drain separator in which a baffle plate is placed in the piping to remove the hydrochloric acid solution, which flows into a trap from a branching tubule. The heating section 54 may conduct a heating step utilizing a surface seawater having a high temperature in addition to function of a boiler, thus constituting an apparatus with reduced costs and environmental load by utilizing seawater as an immediate inexhaustible source.

The collecting unit 6 is provided with a soda ash tank 61, which is made of a stainless steel and stores sodium carbonate ($Na_2CO_3$), a filter 63 for filtering the above-mentioned hydrochloric acid solution in liquid phase to which the above-mentioned sodium carbonate has been added, and a collecting tank 62, which is made of a stainless steel and stores a lithium solution, which is obtained through reaction with the sodium carbonate as filtered. The hydrochloric acid recycling unit 7 is provided with a condenser 71 for condensing the hydrochloric acid solution, a cooling section 72 for conducting the cooling step, and a hydrochloric acid tank 73 for storing hydrochloric acid obtained from the above-mentioned condenser 71. As the above-mentioned cooling section 72, there may be used a deep seawater having a low temperature of the seawater. In this case, this may constitute an apparatus with reduced costs and environmental load by utilizing the seawater.

Now, description will be given below of the lithium recovery method according to the embodiment with the structure as described above. FIG. 2 shows a flow of the lithium recovery method according to the present invention.

Supply Step

As shown in FIG. 2, a lithium containing solution containing lithium (for example, any one of seawater, salt lake water, geothermal water or a waste-dissolved solution) is stored in the storage tank 11 (S1). The lithium containing solution as stored is caused to pass through the filter 12 (S2). This filter 12 can remove impurities having a large particle size.

Adsorption Step

The lithium containing solution, which has passed through the filter 12, is caused to flow into a vacant column adsorption tank 21 of the plurality of column adsorption tanks 21 (S3). Such a flow causes the lithium contained in the lithium containing solution to adsorb specifically selectively on the column. In case where an amount of inflow does not reach a predetermined value and a predetermined period of time does not lapse (S4) concerning the flowing step, the system returns to Step S3 to cause this lithium solution to continuously flow into the column adsorption tank 21. In case where an amount of inflow has reached the predetermined value or the predetermined period of time lapsed (S4) concerning the flowing step, the flowing step is halted (S5).

Elution Step

The hydrochloric acid in an amount of 1 mol/L is flown from the hydrochloric tank storing it into the column adsorption tank 21 to elute the lithium (S6). This Step S6 causes the lithium adsorbed on the column adsorption tank 21 to react with the hydrochloric acid, as shown by Formula 1 as indicated below, to elute an elution liquid as a mixed solution of lithium chloride (LiCl) and the hydrochloric acid (HCl). The thus obtained elution liquid is stored in the elution liquid tank 32 (S7). In case where the whole amount of the lithium containing solution stored in the storage tank 11 is not discharged from the column adsorption tank 21 even after completion of Step S1 (S8), the system returns to Step 7 as mentioned above again to store continuously it into the elution liquid tank 32.

$$Li^+ + HCl \rightarrow LiCl + H^+ \quad \text{(Formula 1)}$$

Cleaning Step

In case where the whole amount of the lithium containing solution is discharged from the column adsorption tank 21 (S8), the cleaning step and the condensation step are carried out simultaneously. First, in the cleaning step, the column placed in the column adsorption tank 21 is washed with pure water (S9). This cleaning step can be carried out by storing the pure water, which has been manufactured by the pure water manufacturing plant 41, in the pure water tank 42 and flowing it into the column adsorption tank 21. After completion of the cleaning step, one of the plurality of columns as washed is selected (S10) and the system returns to Step S3 as mentioned above and the step in S3 and the subsequent step are repeated. The combination of the plurality of columns in this manner permits to use the column, which is always kept clean through the cleaning step with pure water.

Condensation Step

In case where the whole amount of the lithium containing solution is discharged from the column adsorption tank 21 in Step S8, the lithium chloride containing solution as prepared is stored in the condensation tank 51, and then heated at a temperature of 90° C. with the use of the heating section 54 under a reduced pressure of about 0.8 atmospheres, and then flown back into the condensation tank 51 to circulate the lithium chloride containing solution (S11) in the condensation step. The solution stored in this condensation tank 51 is supplied into the drain separator 52 to remove the hydrochloric acid solution, and the resultant in liquid phase is stored as the lithium containing solution in the liquid phase tank 53 (S12).

Collecting Step

In case of the liquid phase as separated by the drain separator 52 through Step S11 (S13), soda ash from the soda ash tank 61, which stores the soda ash (sodium carbonate ($Na_2CO_3$)), is added into the lithium containing solution stored as the liquid phase in the liquid phase tank 53 (S14). The solution with it as added is passed through the filter 63 for filtration (S15). The adding step in Step S14 causes lithium carbonate ($Li_2CO_3$) to precipitate mainly in the solution after the filtration and sodium chloride (NaCl) to coprecipitate partially therein. The lithium containing solution containing such precipitates is collected in the collecting tank 62 (S16).

Hydrochloric Acid Recycling Step

In case of the gas phase as separated by the drain separator 52 in Step S13 as described above, the gas containing the hydrochloric acid is subjected to depressurization by the condenser to about 0.8 atmospheres for cooling condensation (S17). A concentrated hydrochloric acid solution as prepared through this fooling condensation is flown back to the hydrochloric acid tank 31, which has been used in the elution step (S18). It is preferable to maintain the concentration of the hydrochloric acid in the hydrochloric acid tank 31 of about 1 mol/l, as the concentration in which the lithium adsorbed on the column is apt to elute effectively. After the flowing back, the system returns to Step S6 as described above and the step in S6 and the subsequent step are repeated. Such a flowing back in Step S18 makes it possible to control an amount of the hydrochloric acid as initially supplied, which is required for the hydrochloric acid tank 31, thus leading to reduction in costs associated with the hydrochloric acid and effective utilization of the sources.

In Step S14 as described above, it is possible to prepare lithium carbonate ($Li_2CO_3$) with increased concentration by mixing a pure (100%) lithium carbonate ($Li_2CO_3$) solution with the lithium containing solution collected in the collecting tank 62.

In the above description, there are used the supply unit 1, the cleaning unit 4 and the hydrochloric acid recycling unit 7. However, even in case where these units are not used, it is possible to perform recovery of lithium with higher purity in comparison with the conventional known lithium recovery method, although the recovery concentration of the lithium is decreased and a cost for the hydrochloric acid increases.

Results of experiments, which were made in accordance with the present invention, will be described below as an example. However, this example does not limit the scope of the present invention.

EXAMPLE

The recovery of the lithium was made for seawater taken in the coast of the Japan Sea with the use of the lithium recovery apparatus according to the present invention, having the same structure as described above and shown in FIG. 1. The lithium containing solution with the concentration of 90% was collected in the collecting tank 62 as described above. In addition, a pure (100%) lithium carbonate ($Li_2CO_3$) solution was mixed with this lithium containing solution to prepare lithium carbonate ($Li_2CO_3$) with the concentration of 95%. This reveals that according to the lithium recovery apparatus of the present invention, it is possible to achieve the higher lithium recovery rate than the conventional in this manner.

REFERENCE SIGNS LIST 1 supply unit
11 storage tank
12 filter
2 adsorption unit
21 column adsorption tank
3 elution unit
31 hydrochloric acid tank
32 elution liquid tank
4 cleaning unit
41 pure water manufacturing plant
42 pure water tank
5 condensing unit
51 condensing tank
52 drain separator
53 liquid phase tank
54 heating section
6 collecting unit
61 soda ash tank
62 collecting tank
63 filter
7 hydrochloric acid recycling unit
71 condenser
72 cooling section

What is claimed is:

1. A lithium recovery apparatus, which comprises:
an adsorption unit comprising a column adsorption tank containing a lithium adsorption material, the adsorption unit configured to receive a lithium solution containing lithium and to flow the lithium solution containing lithium to the lithium adsorption material, the lithium adsorption material configured to adsorb the lithium;
an elution unit comprising a hydrochloric acid tank and an elution liquid tank, the hydrochloric acid tank configured to flow hydrochloric acid into said column adsorption tank and the elution liquid tank configured to store a lithium elution liquid resulting from a reaction of the hydrochloric acid with the lithium adsorbed on the lithium adsorption material, the lithium elution liquid containing the hydrochloric acid and lithium chloride;
a condensing unit comprising a condensing tank, a heating section, and a drain separator, the condensing tank configured to receive the lithium elution liquid from the elution unit, the heating section configured to receive the lithium elution liquid from the condensing tank, heat the lithium elution liquid, and return the lithium elution liquid to the condensing tank in a cyclic manner, and the drain separator configured to receive lithium elution liquid from the condensing tank and to remove hydrochloric acid from the lithium elution liquid to generate a lithium chloride solution; and
a collecting unit comprising a sodium carbonate tank and a collection tank, the sodium carbonate tank configured to add sodium carbonate the lithium chloride solution obtained from said condensing unit and the collection tank configured to collect the lithium in a form of a resulting solution of a condensed lithium precipitation containing lithium carbonate and sodium chloride.

2. The lithium recovery apparatus as claimed in claim 1, further comprising:
a hydrochloric acid recycling unit comprising a condenser, a cooling section, and a hydrochloric acid tank, the condenser configured to receive a residual liquid of the lithium chloride solution from said condensing unit, the cooling section configured to cool the residual liquid of the lithium chloride solution by a cooling treatment, and hydrochloric acid tank configured to receive the hydrochloric acid obtained through said cooling treatment and to flow the hydrochloric acid to the hydrochloric acid tank of the elution unit.

3. The lithium recovery apparatus as claimed in claim 1, further comprising:
a supply unit comprising a supply tank and a filter, the supply tank configured to pass any one of seawater, salt lake water, geothermal water or a waste-dissolved solution, which contains the lithium, through the filter.

4. The lithium recovery apparatus as claimed in claim 1, further comprising:
a cleaning unit comprising a pure water tank configured to flow water into the column adsorption tank to wash the column adsorption tank.

5. The lithium recovery apparatus as claimed in claim 1, further comprising:
a lithium solution mixing unit configured to add a pure lithium carbonate solution to the condensed lithium precipitation collected by said collecting unit.

* * * * *